(12) United States Patent
Sullivan et al.

(10) Patent No.: US 7,115,049 B2
(45) Date of Patent: Oct. 3, 2006

(54) GOLF BALL WITH LARGE CENTER CORE

(75) Inventors: Michael J Sullivan, Barrington, RI (US); Derek A Ladd, Acushnet, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/665,176

(22) Filed: Sep. 19, 2003

(65) Prior Publication Data
US 2004/0053709 A1 Mar. 18, 2004

Related U.S. Application Data

(63) Continuation-in-part of application No. 10/341,574, filed on Jan. 13, 2003, now Pat. No. 6,852,044, which is a continuation-in-part of application No. 10/002,641, filed on Nov. 28, 2001, now Pat. No. 6,547,677.

(51) Int. Cl.
*A63B 37/12* (2006.01)
(52) U.S. Cl. ..................................... 473/376
(58) Field of Classification Search .............. 473/376, 473/377, 351
See application file for complete search history.

(56) References Cited

U.S. PATENT DOCUMENTS

| 5,743,816 | A | 4/1998 | Ohsumi et al. ............. 473/376 |
|---|---|---|---|
| 5,772,531 | A | 6/1998 | Ohsumi et al. ............. 473/376 |
| 5,779,562 | A * | 7/1998 | Melvin et al. ............. 473/373 |
| 6,057,403 | A * | 5/2000 | Sullivan et al. ............. 525/221 |
| 6,117,025 | A | 9/2000 | Sullivan ..................... 473/373 |
| 6,152,834 | A | 11/2000 | Sullivan ..................... 473/365 |
| 6,213,895 | B1 | 4/2001 | Sullivan et al. ............. 473/374 |
| 6,245,859 | B1 | 6/2001 | Sullivan et al. .......... 525/330.2 |
| 6,299,550 | B1 | 10/2001 | Molitor et al. ............. 473/354 |
| 6,336,872 | B1 | 1/2002 | Moriyama et al. .......... 473/374 |
| 6,361,454 | B1 | 3/2002 | Yoshida et al. ............. 473/376 |
| 6,379,269 | B1 | 4/2002 | Nesbitt et al. ............. 473/371 |
| 6,394,914 | B1 | 5/2002 | Sullivan ..................... 473/376 |

(Continued)

OTHER PUBLICATIONS 6,533,682, Golf Ball, Issued Mar. 18, 2003.

(Continued)

*Primary Examiner*—Raeann Gorden
(74) *Attorney, Agent, or Firm*—Mandi B. Milbank

(57) ABSTRACT

A golf ball is disclosed that provides a softer feel, resilient core for decreased spin rate. The golf ball has a dual-layered core surrounded by a dual-layered cover. The volume of the inner layer of the dual layer core is at least about 70% of the total volume of the inner core layer and the outer core layer. The inner core has a diameter from about 1.25 inches up to about 1.55 inches. The outer core has a diameter from about 1.55 inches up to about 1.62 inches. The compression of the dual core is from about 60 to about 100. The outer core layer is constructed from materials that provide for a Shore C hardness of at least about 80. The dual-layer cover includes an inner layer having a Shore D hardness of at least about 60 and a thickness of about 0.015 inches to about 0.055 inches. The outer core layer has a Shore D hardness of about 62 or less and a thickness less than about 0.035 inches.

15 Claims, 1 Drawing Sheet

U.S. PATENT DOCUMENTS

| | | | |
|---|---|---|---|
| 6,517,451 B1 * | 2/2003 | Cavallaro et al. | 473/371 |
| 6,620,059 B1 * | 9/2003 | Sasaki et al. | 473/374 |
| 6,656,061 B1 * | 12/2003 | Iwami et al. | 473/378 |
| 2002/0013183 A1 | 1/2002 | Sullivan et al. | 473/371 |
| 2002/0019273 A1 | 2/2002 | Ohama | 473/376 |
| 2002/0028885 A1 | 3/2002 | Sullivan et al. | 525/221 |
| 2002/0045696 A1 | 4/2002 | Sullivan et al. | 524/439 |
| 2002/0055399 A1 | 5/2002 | Kato | 473/371 |
| 2002/0061794 A1 | 5/2002 | Sullivan et al. | 473/371 |
| 2002/0068647 A1 | 6/2002 | Ohama | 473/370 |
| 2002/0098915 A1 | 7/2002 | Cavallaro et al. | 473/354 |

OTHER PUBLICATIONS

U.S. Appl. No. 10/051,715, filed Jan. 17, 2002, Thin Thermoset Polyurethane Covered Golf Ball w/ a Dual Core.

U.S. Appl. No. 09/782,782, filed Feb. 13, 2001, Thin-Layer-Covered Multi-Layer Golf Ball.

U.S. Appl. No. 10/335,720, filed Jan. 2, 2003, Golf Ball with Small Inner Core.

U.S. Appl. No. 10/346,763, Thin Thermoset Polyurethane-Covered Golf Ball with a Dual Core.

* cited by examiner

GOLF BALL WITH LARGE CENTER CORE

RELATED APPLICATIONS

This invention is a Continuation-In-Part of U.S. patent application Ser. No. 10/341,574, filed on Jan. 13, 2003, now U.S. Pat. No. 6,852,044, which is a continuation-in-part of U.S. patent application Ser. No. 10/002,641, filed Nov. 28,2001, now U.S. Pat. No. 6,547,677, the disclosures of which are hereby incorporated by reference in their entirety.

FIELD OF THE INVENTION

This invention generally relates to golf balls and more particularly, the invention is directed to golf balls having multi-layered cores and covers and in particular a large inner core and smaller outer core.

BACKGROUND OF THE INVENTION

Conventional golf balls have primarily two functional components: the core and the cover. One purpose of the core is to be the "spring" of the ball or the principal source of resiliency, and the core may be either solid or wound. The primary purpose of the cover is to protect the core. Multi-layer solid balls include multi-layer core constructions, multi-layer cover constructions and combinations thereof. In a golf ball with a multi-layer core, the principal source of resiliency is the multi-layer core. In a golf ball with a multi-layer cover and single-layer core, the principal source of resiliency is the single-layer core.

Two-layer solid balls are made with a single, solid core. This single core is typically constructed from a cross-linked rubber, for example polybutadiene, and is encased by a single layer of hard cover material. Increasing the cross-link density of this core material increases the resiliency of the core. As the resiliency increases, however, the compression may also increase, resulting in a stiffer ball and increasing the spin rate of the ball. Spin rate is an important characteristic of golf balls for both skilled and recreational golfers.

Higher spin rates, although allowing a more skilled player to maximize control of the golf ball, because golf balls to have severely parabolic trajectories and adversely affect driving distance for less skilled players. For the lower skill level players, slicing and hooking the ball are constant obstacles. When a club head strikes a ball improperly, an unintentional side spin is often imparted to the ball, which sends the ball off its intended course. The side spin reduces a player's control over the ball, as well as the direct-line distance the ball will travel. A golf ball that spins less tends not to drift off-line erratically if the ball is not hit squarely with the club face. A low spin ball will not cure the hook or slice, but will reduce the adverse effects of the side spin. Hence, recreational players typically prefer a golf ball that exhibits low spin rate.

In general, the spin rate of golf balls is the end result of many construction variables including the distribution of the density or specific gravity within the golf ball and the relative compression among the various layers in multi-layer golf balls.

Varying materials, density or specific gravity among the various layers of a golf ball controls the spin rate of the golf ball. In one instance, weight from the outer layers of the golf ball is redistributed to the inner layers to decrease the moment of inertia of the golf ball, thereby increasing the spin rate. For example, U.S. Pat. No. 4,625,964 discloses a golf ball with a reduced moment of inertia having an inner core with specific gravity of at least 1.50 and a diameter of less than 32 mm and an intermediate layer of lower specific gravity between the inner core and the cover. U.S. Pat. No. 5,104,126 discloses a ball with a dense inner core having a specific gravity of at least 1.25 encapsulated by a lower density syntactic foam composition. U.S. Pat. No. 5,048,838 discloses another golf ball with a dense inner core having a diameter in the range of 15–25 mm with a specific gravity of 1.2 to 4.0 and an outer layer with a specific gravity of 0.1 to 3.0 less than the specific gravity of the inner core. U.S. Pat. No. 5,482,285 discloses another golf ball with reduced moment of inertia by reducing the specific gravity of an outer core to 0.2 to 1.0.

The total weight of a golf ball has to conform to weight limits set by the United States Golf Association ("USGA"). Although the total weight of the golf ball is controlled, the distribution of weight within the ball can vary. Redistributing the weight or mass of the golf ball either toward the center of the ball or toward the outer surface of the ball changes the dynamic characteristics of the ball at impact and in flight. Specifically, if the density is shifted or redistributed toward the center of the ball, the moment of inertia of the golf ball is reduced, and the initial spin rate of the ball as it leaves the golf club increases as a result of lower resistance from the ball's moment of inertia. Conversely, if the density is shifted or redistributed toward the outer surface of the ball, the moment of inertia is increased, and the initial spin rate of the ball as it leaves the golf club would decrease as a result of the higher resistance from the golf ball's moment of inertia.

The redistribution of weight within the golf ball is typically accomplished by adding fillers to one or more of the core or cover layers of the golf ball. Conventional fillers include the high specific gravity fillers, such as metal or metal alloy powders, metal oxide, metal searates, particulates, and carbonaceous materials and low specific gravity fillers, such as hollow spheres, microspheres and foamed particles. However, the addition of fillers may adversely interfere with the resiliency of the polymers used in golf balls and thereby the coefficient of restitution of the golf balls.

Current dual core golf ball compositions include a stiffening agent in the outer core layer surrounding the inner core. The resulting core has an increased compression. Harder cores, however, produce higher spin rates. Hence, a need remains for a golf ball having a low compression core and increased initial speed.

SUMMARY OF THE INVENTION

The present invention is directed to golf balls having a softer core and the same resiliency as harder dual core golf balls. A golf ball in accordance with the present invention includes an inner core, an outer core encasing the inner core and a cover, which may have an inner cover, and an outer cover. The volume of the inner core is at least about 70%, preferably about 75% and most preferably about 80% of the total volume of the inner core and outer core. The inner core preferably has a diameter from about 1.25 inches up to about 1.55 inches, and more preferably from about 1.30 inches to about 1.50 inches. The inner core is constructed from a rubber material, a cross-linking agent, at least one filler, and an organic peroxide, and is substantially free of organosulfur compounds.

The outer core has preferably a diameter from about 1.55 inches up to about 1.62 inches and a compression from about 60 up to about 100. This core layer is constructed from materials that preferably provide for a Shore C hardness of at least about 80, and more preferably at least about 85. These materials include a rubber material, a cross-linking agent, at least one filler and an organic peroxide.

Surrounding the outer core is an inner cover constructed from materials that produce a Shore D hardness of from about 60 and higher, and preferably about 65 and higher. These materials include an ethylene/methacrylic acid copolymer, an ethylene/acrylic acid copolymer or blends thereof. The thickness of the inner cover is preferably about 0.015 inches to about 0.055 inches, and more preferably about 0.020 inches to about 0.040 inches. Surrounding the inner cover is an outer cover constructed from materials that preferably produce a Shore D hardness from about 62 or less, and more preferably about 55 or less. These materials preferably include a castable polyurethane or polyurea. The thickness of the outer cover is preferably less than about 0.045 inches and more preferably less than about 0.035 inches.

BRIEF DESCRIPTION OF THE DRAWINGS

In the accompanying drawing which forms a part of the specification and is to be read in conjunction therewith and in which like reference numerals are used to indicate like parts in the various views.

DETAILED DESCRIPTION OF PREFERRED EMBODIMENTS

Figure 1:
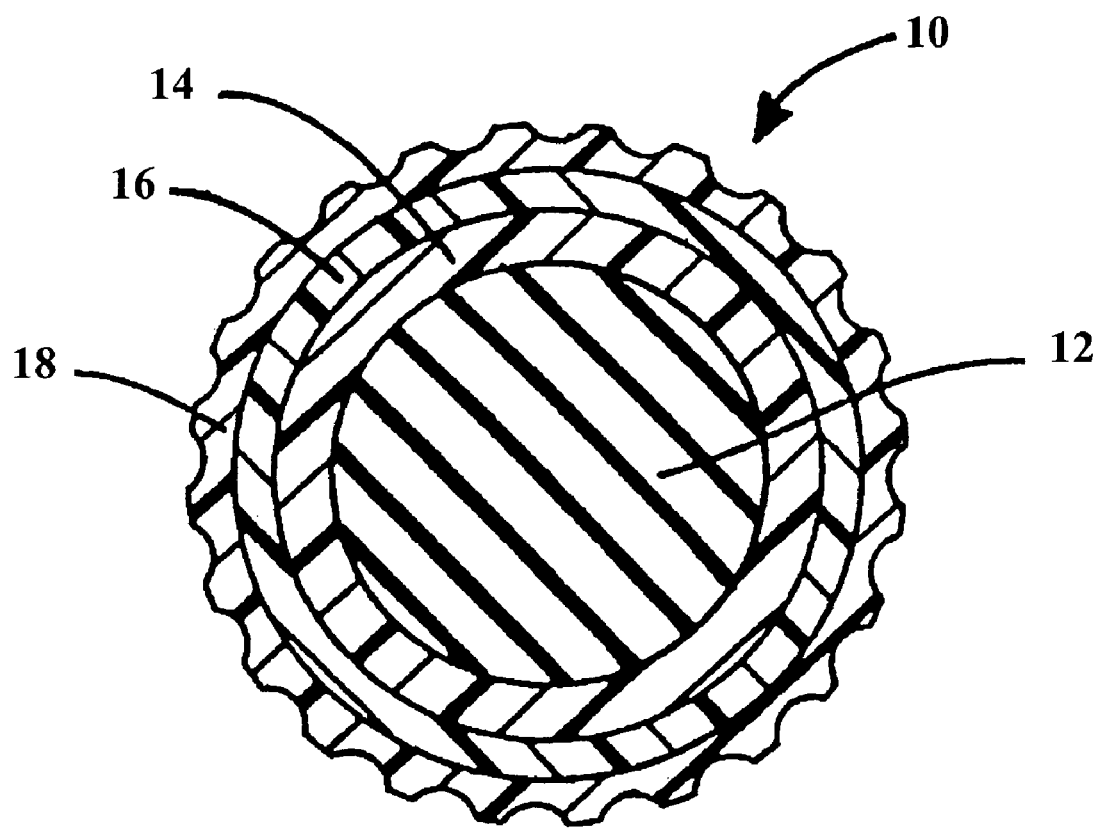
FIG. 1 is a cross-sectional view of a golf ball in accordance with the present invention.

The present invention provides a golf ball having a reduced overall compression with increased resiliency and durability. Golf balls made in accordance with the present invention contain a two-layer core wherein the inner core is a large as possible and the outer core is as thin as possible.

Referring to FIG. 1, golf ball 10 has a dual core construction. This core contains inner core 12 that is encased and surrounded by outer core 14. The dual core is surrounded by a dual cover that includes inner cover 16 and outer cover 18. In general, inner core 12 is constructed to contain the majority of the total volume of the dual core. In one embodiment, inner core contains at least about 70% of the total volume of the dual core, preferably at least about 75% and more preferably at least about 80%. Inner core 12 preferably has a diameter of from about 1.25 inches up to about 1.55 inches, and more preferably from about 1.30 inches to about 1.50 inches. Inner core 12 is constructed to have a low compression. Preferably, inner core 12 has a compression of less than about 55.

Although inner core 12 can be a wound inner core with a solid or fluid-filled center, preferably, inner core 12 is a solid core. Suitable materials for inner core 12 include base rubber materials including resilient polymers such as polybutadiene, natural rubber, polyisoprene, styrene-butadiene, ethylene-propylene-diene rubber, highly neutralized polymers, and combinations thereof. Examples of suitable rubber compounds include polybutadienes made and sold by the Bayer Corporation of Akron, Ohio under the tradenames CB23, CB22, and BR60 and made and sold by the Goodyear Tire and Rubber Company of Akron, Ohio under the tradename 1207G.

In one embodiment, inner core 12 is made from a polybutadiene rubber (PBD) that has a mid Mooney viscosity range greater than about 40, more preferably in the range from about 40 to about 80 and more preferably in the range from about 40 to about 60 Mooney. Polybutadiene rubber with higher Mooney viscosity may also be used, so long as the viscosity of the PBD does not reach a level where the high viscosity PBD clogs or otherwise adversely interferes with the manufacturing machinery. It is contemplated that PBD with viscosity less than 65 Mooney can be used with the present invention. A "Mooney" unit is a unit used to measure the plasticity of raw or unvulcanized rubber. The plasticity in a "Mooney" unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

Golf ball inner cores made with mid to high Mooney viscosity PBD material exhibit increased resiliency, hence distance, without increasing the hardness of the ball. Such inner cores are soft, i.e., compression less than about 60 and more specifically in the range of about 15–55, and when these soft inner cores are incorporated into golf balls such inner cores generate very low spin and long distance when struck by a driver.

CB 23, which has a Mooney viscosity of about 51 and is a highly linear polybutadiene, is a preferred PBD. If desired, the polybutadiene can also be mixed with other elastomers known in the art, such as natural rubber, various copolymers comprising styrene and butadiene, and/or polymers comprising isoprene, such as trans-isoprene, in order to further modify the properties of the inner core. When a mixture of elastomers is used, the amounts of other constituents in the inner core composition are typically based on 100 parts by weight of the total elastomer mixture.

Other suitable inner core materials including thermosetting polymers, such as natural rubber, other grades of polybutadiene, polyisoprene, styrene-butadiene or styrene-propylene-diene rubber, and thermoplastics such as ionomer resins, polyamides, polyesters, or a thermoplastic elastomer. Suitable thermoplastic elastomers include Pebax®, which is believed to comprise polyether amide copolymers, Hytrel®, which is believed to comprise polyether ester copolymers, thermoplastic urethane, and Kraton®, which is believed to comprise styrenic block copolymers elastomers. These products are commercially available from Elf-Atochem, E. I. Du Pont de Nemours and Company, various manufacturers, and Shell Chemical Company, respectively. The inner core materials can also be formed from a partially or fully neutralized ionomer, a metallocene or other single-site catalyzed polymer or a castable thermosetting or thermoplastic material. Suitable castable materials include those comprising a polyurethane, polyurea, epoxy, silicone, IPN's, etc. Golf ball inner cores made with these inner core materials have a PGA compression of preferably less than 90, more preferably less than 80 and most preferably less than 70.

Additionally, other suitable inner core materials are disclosed in U.S. Pat. No. 5,919,100 and international publications WO 00/23519 and WO 01/29129. These disclosures are incorporated by reference herein in their entireties. One particularly suitable material disclosed in WO/29129 is a melt processible composition comprising a highly neutralized ethylene copolymer and one or more aliphatic, monofunctional organic acids having fewer than 36 carbon atoms of salts thereof, wherein greater than 90% of all the acid of the ethylene copolymer is neutralized.

Inner core 12 may also include a cross-linking agent, a cross-linking aid or activator, a weight or density adjusting additive and a free radical initiator. The use of cross-linking agents in golf ball cores is known in the art. Suitable cross-linking agents include the reaction product of an unsaturated carboxylic acid or acids and an oxide or carbonate of a metal such as zinc, magnesium, barium, calcium, lithium, sodium, potassium, cadmium, lead, tin and the like. For example, the unsaturated carboxylic acids include α- or β-ethylenic unsaturated acids such as acrylic acid, methacrylic acid, itaconic acid, crotonic acid, sorbic acid and mixtures thereof. The unsaturated carboxylic acids and metal salts thereof are generally soluble in the elastomeric base, or are readily dispersible. For example, metal salt diacrylates, dimethacrylates, or mono(meth)acrylates are preferred for use in the golf ball cores of the present invention, and zinc diacrylate is a particularly preferred cross-linking agent. Other metal salt di- or mono-(meth) acrylates suitable for use in the present invention include those in which the metal is calcium or magnesium.

Inner core 12 can also include a cross-linking activator to promote sufficient cross-linking of the base rubber material. A suitable cross-linking activator is zinc oxide. Zinc oxide can also be used as a weight adjusting filler and to achieve a higher coefficient of restitution. Additional processing aids such as dispersants and activators may optionally be included. In particular, zinc stearate may be added as a processing aid (e.g. as an activator). Any of a number of specific gravity adjusting fillers may be included to obtain a preferred total weight of the core 12. Examples of such fillers include tungsten and barium sulfate. Preferably, the specific gravity adjusting filler is tungsten.

A free radical initiator is included in inner core 12 to promote cross-linking of the base rubber material and the cross-linking agent. The free radical initiator promotes cross-linking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Preferably, the peroxide is an organic peroxide. Suitable peroxides include dicumyl peroxide, n-butyl 4,4'-bis (butylperoxy) valerate, 1,1-bis(t-butylperoxy)-3,3,5-trimethyl cyclohexane, di-t-butyl peroxide and 2,5-di-(t-butylperoxy)-2,5 dimethyl hexane and the like and mixtures thereof. In one embodiment, the free radical initiator is Trigonox®, which is commercially available from Akzo Nobel Chemicals B.V. of Amersfoort, The Netherlands. The total amount of initiators used will vary depending on the specific end product desired and the particular initiators employed.

Other useful initiators would be readily apparent to one of ordinary skill in the art without any need for undue experimentation. The initiator(s) at about 40% to about 100% activity are preferably added in an amount ranging between about 0.05 pph and about 5 pph based upon 100 parts of polybutadiene, or polybutadiene mixed with one or more other elastomers. More preferably, the amount of initiator added ranges between about 0.15 pph to about 2 pph and most preferably between about 0.25 pph to about 1.5 pph. Suitable commercially available dicumyl peroxides include Perkadox BC, which is a 90% active dicumyl peroxide, and DCP 70, which is a 70% active dicumyl peroxide.

Golf balls constructed in accordance with the present invention are substantially free of halogenated organo-sulfur compounds, including organic compounds wherein at least one sulfur compound is added to the material, that are typically added to golf ball inner cores to increase the resiliency and the coefficient of restitution of the ball. Examples of these halogenated organo-sulfur compounds include, but are not limited to, pentachlorothiophenol (PCTP) and salts of PCTP such as ZnPCTP.

Outer core 14 surrounds inner core 12 and is contacted therewith. Outer core 14 has a diameter between about 1.55 inches and about 1.62 inches. Outer core 14 is constructed of materials such that is has a Shore C hardness of at least 80 and preferably at least 85. In addition, the hardness and thickness of outer core 14 are selected so as to result in an overall compression for the dual core of from about 60 up to about 100. Outer core 14 includes a base rubber material, cross-linking agent, cross-linking initiator and free radical initiator. Suitable compounds for these components are the same as for inner core 12. For outer core 14, however, these components are configured to provide the desired properties in outer core 14. In addition, outer core 14 can include a stiffening agent, such as balata, trans-polyisoprene, etc. Suitable commercially available trans-polyisoprenes include TP251 and TP301 made and sold by the Kuraray Co. Ltd., 2-9-1 Hacchobori, Chou-Ku, Tokyo, 104, Japan. Since outer core 14 is relatively thin, it does not significantly contribute to the compression of the golf ball.

Inner cover 16 surrounds outer core 14 and is in contact therewith. The thickness of inner cover 16 is from about 0.015 inches up to about 0.055 inches, and preferably from about 0.020 inches to about 0.040 inches. Inner cover 16 is constructed of materials that provide for a Shore D hardness of from about 60 or higher, and preferably about 65 or higher. Inner cover 16 is preferably made from thermoplastic materials. More preferably, the material is a non-ionomeric polymer. Suitable thermoplastic materials for inner cover 16 include polyethylene, polystyrene, polypropylene, thermoplastic polyesters, acetal, polyamides including semicrystalline polyamide, polycarbonate (PC), shape memory polymers, polyvinyl chloride (PVC), trans-polybutadiene, liquid crystalline polymers, polyether ketone (PEEK), bio(maleimide), and polysulfone resins. In one embodiment, inner cover includes an ethylene/methacrylic acid copolymer, an ethylene/acrylic acid copolymer or blends thereof. Suitable ethylene/methacrylic acid copolymers include Surlyn®8527, which is commercially available from E. I. du Pont de Nemours and Company of Wilmington, Del. Other preferred thermoplastics for forming inner cover include single-site catalyzed polymers including non-metallocene and metallocene, polyurethane, polyurea and combinations thereof. Suitable polymeric materials also include those listed in U.S. Pat. Nos. 6,187,864, 6,232,400, 6,245,862, 6,290,611 and 6,142,887 and in PCT publication No. WO 01/29129, which are incorporated herein by reference in their entirety. Suitable materials are also disclosed in an U.S. patent application entitled "Golf Ball with Vapor Barrier Layer," bearing application Ser. No. 10/077,081, filed on Feb. 15, 2002. The entire disclosure of this application is incorporated herein by reference.

The inner cover may be applied to the inner core as a liquid solution, dispersion, lacquer, paste, gel, melt, etc., such as a loaded or filled natural or non-natural rubber latex, polyurethane, polyurea, epoxy, polyester, any reactive or non-reactive coating or casting material, and then cured, dried or evaporated down to the equilibrium solids level. The inner cover may also be formed by compression or injection molding, RIM, casting, spraying, dipping, powder coating, or any means of depositing materials onto the inner core. The inner cover may also be a thermoplastic polymer loaded with a specific gravity increasing filler, fiber, flake or particulate, such that it can be applied as a thin coating and meets the preferred specific gravity levels discussed above.

For reactive liquid systems, the suitable materials include any material which reacts to form a solid such as epoxies, styrenated polyesters, polyurethanes or polyureas, liquid PBR's, silicones, silicate gels, agar gels, etc. Casting, RIM, dipping and spraying are the preferred methods of applying a reactive inner cover. Non-reactive materials include any combination of a polymer either in melt or flowable form, powder, dissolved or dispersed in a volatile solvent. Suitable thermoplastics are disclosed in U.S. Pat. Nos. 6,149,535 and 6,152,834.

Alternatively, the inner cover may be a loaded thin film or "pre-preg" or a "densified loaded film," as described in U.S. Pat. No. 6,010,411 ("the '411 patent") related to golf clubs, may be used as the thin film layer in a compression molded or otherwise in a laminated form applied inside the outer cover. The "pre-preg" disclosed in the '411 patent may be used with or without the fiber reinforcement, so long as the preferred specific gravity and preferred thickness levels are satisfied. The loaded film comprises a staged resin film that has a densifier or weighing agent, preferably copper, iron or tungsten powder evenly distributed therein. The resin may be partially cured such that the loaded film forms a malleable sheet that may be cut to desired size and then applied to the outside of the inner core or inside of the cover. Such films are available from the Cytec of Anaheim, Calif. or Bryte of San Jose, Calif.

Outer cover 18 surrounds inner cover 16 and is in contact therewith. The thickness of outer cover 18 is less than about 0.045 inches and preferably less than about 0.035 inches. Outer cover 18 is constructed of materials that provide for a shore D hardness of from about 62 or less and preferably about 55 or less. These materials include materials commonly known to those of skill in the art. Preferably, the material includes polyurethane, polyurea, or a combination thereof. Outer cover layer 18 is preferably formed with a plurality of dimples or surface protrusions defined on the outer surface thereof. The polymer forming the outer cover 18 may include fillers embedded in a polymeric matrix or binder material.

Conventionally, thermoset polyurethanes are prepared using a diisocyanate, such as 2,4-toluene diisocyanate (TDI) or methylenebis-(4-cyclohexyl isocyanate) (HMDI) and a polyol which is cured with a polyamine, such as methylenedianiline (MDA), or a trifunctional glycol, such as trimethylol propane, or tetrafunctional glycol, such as N,N,N', N'-tetrakis(2-hydroxypropyl)ethylenediamine. However, the present invention is not limited to just these specific types of thermoset polyurethanes. Quite to the contrary, any suitable thermoset polyurethane may be employed to form the outer cover layer of the present invention. In one embodiment, outer cover 18 includes castable polyurethanes and castable polyureas.

Overall, golf ball 10 is formulated and constructed to have a compression from about 80 up to about 90 and coefficient of restitution of greater than about 0.805. As used herein, compression is measured by applying a spring-loaded force to the golf ball center, golf ball inner core or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as:

(Atti or PGA compression)=(160-Riehle Compression).

EXAMPLES

Various formulations of the golf ball in accordance with the present invention were tested against commercially available golf balls for a comparison of launch angle, spin rate and speed. The physical properties of the various formulations and commercially available reference balls are listed in Table 1.

TABLE 1

Physical Properties

| BALL | Comp. (Ball) | Weight (Ball) | Cover Shore D Hardness | Co-efficient of Restitution | Comp. Center Core | Outer Core Shore C Hardness |
|---|---|---|---|---|---|---|
| Comparative Golf Balls | | | | | | |
| C1 | 88 | 1.603 | 68 | 0.808 | | |
| C2 | 88 | 1.610 | 58 | 0.811 | | |
| C3 | 98 | 1.609 | 60 | 0.808 | | |
| Tested Inventive Embodiments | | | | | | |
| T1 | 74 | 1.599 | 60 | 0.808 | 32 | 92 |
| T2 | 82 | 1.601 | 60 | 0.812 | 46 | 89 |
| T3 | 84 | 1.599 | 60 | 0.812 | 46 | 92 |
| T4 | 92 | 1.605 | 60 | 0.820 | 65 | 87 |
| T5 | 95 | 1.605 | 60 | 0.820 | 65 | 89 |

Golf ball C1 is the Pinnacle® Gold Distance ball. Golf ball C2 is the ProV1® ball, and golf ball C3 is the ProV1X® ball. These golf balls are commercially available from Acushnet of Fairhaven, Mass. The inner cores of the test balls contained tungsten. Each test ball was constructed with a 1.45 inch inner core, 1.55 inch dual core, 1.620 inch inner cover, and 1.680 inch outer cover. The cover materials are the same for all the inventive balls.

The formulations for the inner and outer cores of test balls T1–T5 are given in Tables 2–6.

TABLE 2

TEST BALL T1

| CONSTITUENT | PHR | WEIGHT % | VOLUME % |
|---|---|---|---|
| INNER CORE | | | |
| Polybutadiene (CB23) | 95.24 | 67.54 | 83.5 |
| Zinc Oxide | 3 | 2.13 | 0.43 |
| Zinc Diacrylate | 28 | 19.86 | 14.99 |
| Triginox ® | 0.53 | 0.38 | 0.33 |
| Tungsten | 14.24 | 10.1 | 0.75 |
| OUTER CORE | | | |
| Polybutadiene (CB23) | 88 | 52.92 | 65.42 |
| Stiffening Agent (TP251 or TP301) | 8 | 4.81 | 5.82 |
| Zinc Diacrylate | 60 | 36.08 | 27.24 |
| Triginox ® | 0.66 | 0.40 | 0.34 |
| Zinc Oxide | 9.63 | 5.79 | 1.17 |

TABLE 3

TEST BALL T2

| CONSTITUENT | PHR | WEIGHT % | VOLUME % |
|---|---|---|---|
| INNER CORE | | | |
| Polybutadiene (CB23) | 94.73 | 66.44 | 82.14 |
| Zinc Oxide | 3 | 2.1 | 0.42 |
| Zinc Diacrylate | 31 | 21.74 | 16.42 |
| Triginox ® | 0.53 | 0.37 | 0.32 |
| Tungsten | 13.31 | 9.34 | 0.7 |
| OUTER CORE | | | |
| Polybutadiene (CB23) | 89.4 | 54.76 | 67.7 |
| Stiffening Agent (TP251 or TP301) | 8 | 4.9 | 5.93 |
| Zinc Diacrylate | 53 | 32.47 | 24.51 |
| Triginox ® | 0.66 | 0.4 | 0.35 |
| Zinc Oxide | 12.19 | 7.47 | 1.51 |

TABLE 4

TEST BALL T3

| CONSTITUENT | PHR | WEIGHT % | VOLUME % |
|---|---|---|---|
| INNER CORE | | | |
| Polybutadiene (CB23) | 94.73 | 66.44 | 82.14 |
| Zinc Oxide | 3 | 2.1 | 0.42 |
| Zinc Diacrylate | 31 | 21.74 | 16.42 |
| Triginox ® | 0.53 | 0.37 | 0.32 |
| Tungsten | 13.31 | 9.34 | 0.7 |
| OUTER CORE | | | |
| Polybutadiene (CB23) | 88 | 52.92 | 65.42 |
| Stiffening Agent (TP251 or TP301) | 8 | 4.81 | 5.82 |
| Zinc Diacrylate | 60 | 36.08 | 27.24 |
| Triginox ® | 0.66 | 0.40 | 0.34 |
| Zinc Oxide | 9.63 | 5.79 | 1.17 |

TABLE 5

TEST BALL T4

| CONSTITUENT | PHR | WEIGHT % | VOLUME % |
|---|---|---|---|
| INNER CORE | | | |
| Polybutadiene (CB23) | 94.22 | 65.37 | 80.81 |
| Zinc Oxide | 3 | 2.08 | 0.42 |
| Zinc Diacrylate | 34 | 23.59 | 17.81 |
| Triginox ® | 0.53 | 0.37 | 0.32 |
| Tungsten | 12.39 | 8.6 | 0.64 |
| OUTER CORE | | | |
| Polybutadiene (CB23) | 90.8 | 56.67 | 70.06 |
| Stiffening Agent (TP251 or TP301) | 8 | 4.99 | 6.04 |
| Zinc Diacrylate | 46 | 28.71 | 21.68 |
| Triginox ® | 0.66 | 0.41 | 0.36 |
| Zinc Oxide | 14.75 | 9.21 | 1.86 |

TABLE 6

TEST BALL T5

| CONSTITUENT | PHR | WEIGHT % | VOLUME % |
|---|---|---|---|
| INNER CORE | | | |
| Polybutadiene (CB23) | 94.22 | 65.37 | 80.81 |
| Zinc Oxide | 3 | 2.08 | 0.42 |
| Zinc Diacrylate | 34 | 23.59 | 17.81 |
| Triginox ® | 0.53 | 0.37 | 0.32 |
| Tungsten | 12.39 | 8.6 | 0.64 |
| OUTER CORE | | | |
| Polybutadiene (CB23) | 89.4 | 54.76 | 67.7 |
| Stiffening Agent (TP251 or TP301) | 8 | 4.9 | 5.93 |
| Zinc Diacrylate | 53 | 32.47 | 24.51 |
| Triginox ® | 0.66 | 0.4 | 0.35 |
| Zinc Oxide | 12.19 | 7.47 | 1.51 |

A first set of tests were run to simulate a full wedge hitting each ball. The test was set-up for an initial launch angle of about 24 degrees at a spin of about 9389–96 revolutions per minute and speed of about 94 to 95 feet per second. Each ball was tested 12 times. Results for this test are given in Table 7. Test golf balls T4 and T5 demonstrated similar speeds and spins to the comparative balls. Test golf ball T3 had about the same amount of spin as comparative golf ball C1 but at an increased speed. Tests balls T1 and T2 produced the best results having both decreased spin compared to balls C1–C3 and increased speed. T1 and T2 had low compression centers surrounded by relative hard outer core compositions.

TABLE 7

Full Wedge Spin Test

| BALL | Launch Angle | STD. | Spin-rev/min. | STD. | Speed-ft/s | STD. |
|---|---|---|---|---|---|---|
| Comparative Golf Balls | | | | | | |
| C1 | 25.6 | 0.5 | 8764 | 474 | 94.8 | 0.7 |
| C2 | 24.5 | 0.3 | 9402 | 173 | 95.5 | 0.7 |
| C3 | 24.3 | 0.3 | 9396 | 165 | 95.3 | 0.6 |
| Tested Inventive Embodiments | | | | | | |
| T1 | 25.4 | 0.4 | 8458 | 218 | 96.4 | 0.4 |
| T2 | 25.3 | 0.4 | 8689 | 203 | 96.2 | 0.6 |
| T3 | 25.1 | 0.4 | 8796 | 182 | 96.2 | 0.7 |
| T4 | 24.5 | 0.3 | 9440 | 133 | 95.7 | 0.7 |
| T5 | 24.3 | 0.4 | 9499 | 150 | 95.9 | 0.5 |

A second set of tests were run to simulate a half wedge hitting each ball. The test was set-up for an initial launch angle of about 31 degrees at a spin of about 6906–23 revolutions per minute and speed of about 53 to 54 feet per second. Each ball was tested 12 times. Results for this test are given in Table 8. The results for the half wedge spin test mirror those of the full wedge spin test. Again, golf balls T1 and T2 produced the best combination of spin and speed.

TABLE 8

Half Wedge Spin Test

| BALL | Launch Angle | STD. | Spin-rev/min. | STD. | Speed-ft/s | STD. |
|---|---|---|---|---|---|---|
| Comparative Golf Balls | | | | | | |
| C1 | 35.1 | 1.0 | 5279 | 470 | 52.8 | 0.3 |
| C2 | 31.1 | 0.3 | 6938 | 131 | 53.8 | 0.2 |
| C3 | 31.0 | 0.2 | 6968 | 94 | 53.5 | 0.2 |
| Tested Inventive Embodiments | | | | | | |
| T1 | 31.9 | 0.3 | 6538 | 96 | 53.8 | 0.3 |
| T2 | 31.6 | 0.3 | 6642 | 138 | 53.9 | 0.2 |
| T3 | 31.6 | 0.4 | 6690 | 119 | 53.8 | 0.3 |
| T4 | 31.1 | 0.3 | 6999 | 112 | 53.8 | 0.3 |
| T5 | 31.1 | 0.3 | 6952 | 122 | 53.7 | 0.2 |

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A golf ball comprising a core comprising an inner core and an outer core and a cover comprising an inner cover and an outer cover wherein the inner core is encased by an outer core and the inner core comprises at least about 70% of the total volume of the core, wherein the inner core has an outer diameter of about 1.30 inches to about 1.50 inches, a compression from about 15 to about 55, and wherein the outer core has a Shore C hardness of at least 80 and is comprised of a rubber material, a cross-linking agent, at least one filler, an organic peroxide, and a stiffening agent, such that the core has a compression of between 60 and 100.

2. The golf ball of claim 1, wherein the inner core comprises at least about 75% of the total volume of the core.

3. The golf ball of claim 1, wherein the inner core comprises at least about 80% of the total volume of the core.

4. The golf ball of claim 1, wherein the inner core comprises a rubber material, a cross-linking agent, at least one filler, and an organic peroxide.

5. The golf ball of claim 1, wherein the outer core has a diameter from about 1.55 inches up to about 1.62 inches.

6. The golf ball of claim 1, wherein the hardness of the outer core is at least about 85 Shore C.

7. The golf ball of claim 1, wherein the inner cover has a Shore D hardness of at least about 60.

8. The golf ball of claim 7, wherein the hardness of the inner cover is at least about 65 Shore D.

9. The golf ball of claim 1, wherein the inner cover has a thickness of about 0.015 inches to about 0.055 inches.

10. The golf ball of claim 9, wherein the thickness of the inner cover is about 0.020 inches to about 0.040 inches.

11. The golf ball of claim 1, wherein the outer cover has a Shore D hardness about 62 or less, such that the ball has a compression from about 80 to about 90.

12. The golf ball of claim 11, wherein the hardness of the outer cover is about 55 Shore D or less.

13. The golf ball of claim 11, wherein the outer cover has a thickness of less than about 0.045 inches.

14. The golf ball of claim 13, wherein the thickness of the outer cover is less than about 0.35 inches.

15. The golf ball of claim 1, wherein the inner cover comprises an ethylene/methacrylic acid copolymer or an ethylene/acrylic acid copolymer, and the outer cover comprises a castable polyurethane or polyurea.

* * * * *